United States Patent
Hang et al.

(10) Patent No.: US 9,547,720 B2
(45) Date of Patent: Jan. 17, 2017

(54) ACCESS CONTROL FOR ENCRYPTED QUERY PROCESSING

(71) Applicants: Isabelle Hang, Karlsruhe (DE); Florian Kerschbaum, Karlsruhe (DE); Martin Haerterich, Wiesloch (DE); Mathias Kohler, Stutensee (DE); Andreas Schaad, Bruchsal (DE); Axel Schroepfer, Rheinstetten (DE); Walter Tighzert, Heidelberg (DE)

(72) Inventors: Isabelle Hang, Karlsruhe (DE); Florian Kerschbaum, Karlsruhe (DE); Martin Haerterich, Wiesloch (DE); Mathias Kohler, Stutensee (DE); Andreas Schaad, Bruchsal (DE); Axel Schroepfer, Rheinstetten (DE); Walter Tighzert, Heidelberg (DE)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 14/582,471

(22) Filed: Dec. 24, 2014

(65) Prior Publication Data

US 2016/0357869 A1 Dec. 8, 2016

(51) Int. Cl.
G06F 21/00 (2013.01)
G06F 17/30 (2006.01)
H04L 29/06 (2006.01)

(52) U.S. Cl.
CPC ... *G06F 17/30867* (2013.01); *G06F 17/30433* (2013.01); *G06F 17/30528* (2013.01); *G06F 17/30554* (2013.01); *H04L 63/0428* (2013.01); *H04L 63/101* (2013.01)

(58) Field of Classification Search
CPC combination set(s) only.
See application file for complete search history.

(56) References Cited

U.S. PATENT DOCUMENTS

| | | |
|---|---|---|
| 5,572,673 A | 11/1996 | Shurts |
| 6,038,563 A | 3/2000 | Bapat et al. |
| 6,487,552 B1 | 11/2002 | Lei et al. |
| 7,743,069 B2 | 6/2010 | Chitkara et al. |
| 7,844,829 B2 | 11/2010 | Meenakshisundaram |
| 7,995,750 B2 | 8/2011 | Kerschbaum et al. |
| 2003/0046572 A1 | 3/2003 | Newman et al. |
| 2004/0139043 A1 | 7/2004 | Lei et al. |
| 2004/0243816 A1 | 12/2004 | Hacigumus et al. |
| 2008/0033960 A1 | 2/2008 | Banks et al. |
| 2012/0159180 A1* | 6/2012 | Chase .............. G06F 21/6227 713/183 |
| 2012/0330925 A1 | 12/2012 | Ramamurthy et al. |

(Continued)

*Primary Examiner* — Beemnet Dada
(74) *Attorney, Agent, or Firm* — Fish & Richardson P.C.

(57) ABSTRACT

Methods, systems, and computer-readable storage media for enforcing access control in encrypted query processing. Implementations include actions of obtaining a set of user groups based on the user credential and a user group mapping, obtaining a set of relations based on the query, obtaining a set of virtual relations based on the set of user groups and the set of relations, receiving a first rewritten query based on the set of virtual relations and a query rewriting operation, encrypting the first rewritten query to provide an encrypted query, and transmitting the encrypted query to at least one server computing device over a network for execution of the encrypted query over access controlled, encrypted data.

20 Claims, 5 Drawing Sheets

(56) References Cited

U.S. PATENT DOCUMENTS

| | | | |
|---|---|---|---|
| 2013/0191650 A1* | 7/2013 | Balakrishnan | G06F 21/6227 713/190 |
| 2013/0246813 A1 | 9/2013 | Mori et al. | |
| 2013/0262863 A1 | 10/2013 | Yoshino et al. | |
| 2014/0101438 A1 | 4/2014 | Elovici et al. | |

* cited by examiner

Require: $\kappa_{v_1}(R_1), \ldots, \kappa_{v_i}(R_i), (\kappa_{w_1}(S_1), \ldots, \kappa_{w_j}(S_j))$ k virtual relations
$Q$: query containing one or more relational operations $\Delta$ 1: for all $avg \in Q$ do
2:     rewrite $\beta \gamma_{Avg(A_l)}(R)$ as $Q_k = \beta \gamma_{Sum,Count(A_l)}(R)$
3:     generate $cQ$
4: end for
5: for all $\rho \in Q$ do
6:     rewrite $\rho(R)$ as $Q_t = \rho(\kappa_{v_k}(R_k))$ for all $k, t = 1, \ldots, i$
7: end for
8: for all unary $\sigma \in Q$ do
9:     rewrite $Q_t = \sigma(R)$ as $Q_t = \sigma(\kappa_{v_k}(R_k))$ for all $k, t = 1, \ldots, i$
10: end for
11: for all $\pi \in Q$ do
12:     rewrite $\pi(R)$ as $Q_t = \pi(R_k)$ for all $k, t = 1, \ldots, i$
13: end for
14: for all $max \lor min \lor sum \in Q$ do
15:     rewrite $\gamma_{F(R,A_l)}\Delta R$ as
        $Q_t = \gamma_{F(R_k,A_l)}\Delta(\kappa_{v_k}(R_k))$ for all $k, t = 1, \ldots, i$
16:     if $\exists cQ$ then
17:         modify $cQ$
18:     else
19:         generate $cQ$
20:     end if
21: end for
22: for all $\cup \lor \setminus \lor \times \lor \bowtie \in Q$ do
23:     rewrite $\Delta(R, S)$ as $Q_t = \Delta(R_k, S_l)$ for all $k = 1, \ldots, i, l = 1, \ldots, j$, and $t = 1, \ldots, i * j$
24: end for
25: for all $sort \lor group \in Q$ do
26:     rewrite $\beta \gamma_{F(R,A_l)}\Delta(Q_t)$ as $\beta \gamma_{F(R_k,A_l)}\Delta(Q_t)$
        for all $t = 1, \ldots, i$ in case $Q$ unary or $t = 1, \ldots, i * j$ in case $Q$ binary
27:     if $\exists cQ$ then
28:         modify $cQ$
29:     else
30:         generate $cQ$
31:     end if
32: end for
33: if $Q$ unary then
34:     rewrite $\Delta R$ as $sQ = \bigcup_{t=1,\ldots,i} Q_t$
35: end if
36: if $Q$ binary then
37:     rewrite $\Delta(R, S)$ as $sQ = \bigcup_{t=1,\ldots,i*j} Q_t$
38: end if
39: for all $count\ distinct \lor count \in Q$ do
40:     rewrite $\beta \gamma_{F(R_k,A_l)}(sQ)$ as $sQ = \beta \gamma_{F(R_k,A_l)} sQ$
41: end for
42: return $sQ, (cQ)$

FIG. 3

ACCESS CONTROL FOR ENCRYPTED QUERY PROCESSING

BACKGROUND

Encrypted databases provide data protection (security) in cloud platforms and/or database-as-a-service settings. In encrypted databases, data (cleartext) can be encrypted at the client to provide encrypted data (ciphertext), which can be provided to the database for storage. In some examples, a third-party provides the database for interaction with one or more applications, although the stored data is encrypted. That is, the database is outsourced to the third-party.

Outsourcing a database offers efficient resource management and low maintenance costs for clients, but exposes outsourced data (client data) to a service provider (the third-party providing the database and its agents). To ensure data confidentiality, data owners seek to prevent unauthorized access, while data is stored or processed. Storing data on an untrusted database requires protection measures against, for example, curious personnel working for the service provider or outside attackers exploiting software vulnerabilities on the database server. In addition, data owners also seek to control data access for their own personnel.

SUMMARY

Implementations of the present disclosure include computer-implemented methods for enforcing access control in encrypted query processing. In some implementations, actions include obtaining a set of user groups based on the user credential and a user group mapping, the set of user groups including at least one user group, obtaining a set of relations based on the query, obtaining a set of virtual relations based on the set of user groups and the set of relations, the set of virtual relations including at least one virtual relation, receiving a first rewritten query based on the set of virtual relations and a query rewriting operation, encrypting the first rewritten query to provide an encrypted query, and transmitting the encrypted query to at least one server computing device over a network for execution of the encrypted query over access controlled, encrypted data. Other implementations of this aspect include corresponding systems, apparatus, and computer programs, configured to perform the actions of the methods, encoded on computer storage devices.

These and other implementations can each optionally include one or more of the following features: actions further include determining that the query includes at least one operation that is included in a set of predefined operations, and in response, initiating a key adjustment; the user group mapping maps one or more users to one or more user groups, based on an access control matrix that indicates which users are allowed access to which data stored in an encrypted database; the set of virtual relations is obtained further based on a virtual relation mapping that maps at least one relation and user group pair to a virtual relation; actions further include: receiving an encrypted result from the server computing device, and decrypting the encrypted results to provide a query result; actions further include: receiving a second rewritten query based on the set of virtual relations and the query rewriting operation, and obtaining a final query result based on the second rewritten query and the query result; and the set of pre-defined operations includes one or more of a count operation, a count distinct operation, an equi-join operation, and a set difference operation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts an example listing for a query rewriting operation in accordance with implementations of the present disclosure.

Like reference symbols in the various drawings indicate like elements.

DETAILED DESCRIPTION

Implementations of the present disclosure are generally directed to enforcing access control in encrypted query processing. More specifically, implementations of the present disclosure are directed to securely executing queries (encrypted queries) over sensitive, access restricted data (encrypted data subject to one or more access control policies) on an outsourced database. In some implementations, an encryption-based access control model is provided. In some examples, the access control model defines access control restrictions at the level of attribute values and applies encryption as a relational operation to enforce the access restrictions on a relational algebra. In some implementations, techniques for query execution over encrypted, access restricted data on the database are provided. An example technique includes a query rewriting strategy to adapt relational operations over data encrypted with different keys. Other example techniques include a privacy-preserving routine for performing join operations and set difference operations in a multi-user mode, and a post-processing routine on the client-side, which conserves computational effort on the client, while preserving the confidentiality of the data.

Figure 1:
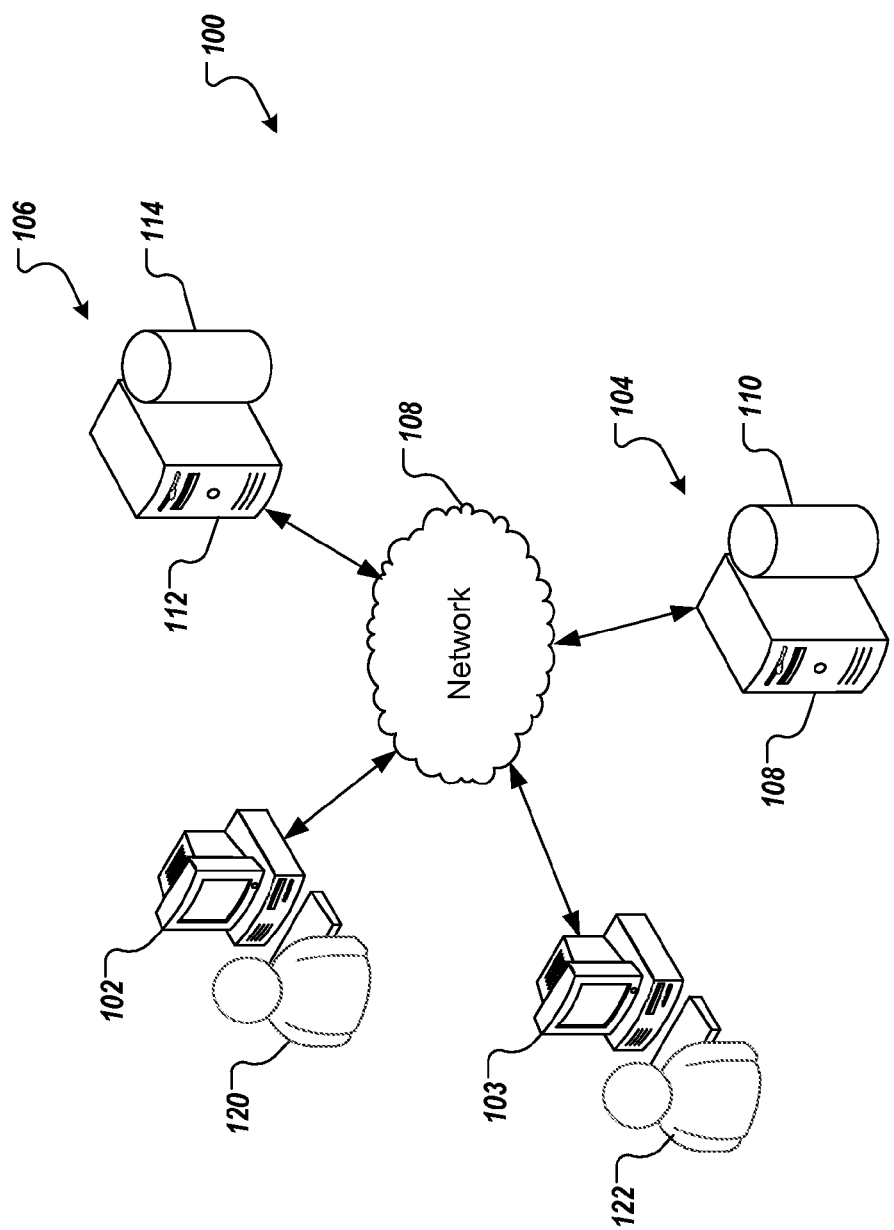
FIG. 1 depicts an example high-level architecture in accordance with implementations of the present disclosure.

FIG. 1 depicts an example high-level architecture 100 in accordance with implementations of the present disclosure. The high-level architecture 100 includes computing devices 102, 103, e.g., client-side computing devices, server systems 104, 106 and a network 108. In some examples, the computing devices 102, 103 and the server systems 104, 106 communicate over the network 108. In some examples, the computing devices 102, 103 can communicate with the server systems 104, 106 over one or more networks (e.g. including the network 108). In some examples, the computing devices 102, 103 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, each server system 104, 106 includes at least one server and at least one data store. In the example of FIG. 1, the server systems 104, 106 is intended to represent various forms of servers including, but not limited to, a web server, an application server, a proxy server, a network server, and/or a server pool. In general, server systems accept requests for application services and provides such services to any number of client devices, e.g., the computing devices 102, 103, over the network 108.

In some implementations, the network 108 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 hosts one or more applications. That is, for example, the server system 104 can be provided as an application server. In some examples, an application is provided as one or more computer-executable programs. In some implementations, each computing device 102, 103 can be used to interact with an application hosted on the server system 104. For example, a user 120 can interact with the computing device 102 to interact with an application hosted on the server system 104, and a user 122 can interact with the computing device 103 to interact with an application hosted on the server system 104.

In some implementations, the server system 106 can maintain a database that stores encrypted data. In some examples, the database is referred to as an encrypted database. In some examples, an application hosted on the server system 104 interacts with the encrypted database. For example, and as described in further detail herein, the application can query the database by submitting one or more encrypted queries to the server system 106. In some examples, data stored in the encrypted database is encrypted at the computing device 102, the computing device 103 and/or the server system 104, and the encrypted data is sent to the server system 106 over the network 108 for storage. In some implementations, and as described herein, the server system 106 can be provided by a third-party service provider, which stores and provides access to the encrypted data.

Enhancing data security in an outsourced database can be achieved using encrypted query processing, which includes executing encrypted queries over encrypted data. In a multi-user mode, e.g., where two or more users are querying encrypted data, additional fine-grained access control mechanisms can be used to grant or restrict shared data access to users processing unencrypted query results. In some cases, implementing such a multi-user mode using encrypted query processing for a single user, combined with an additional authorization step at the application server can be compromised. As an example, a user working for the data owner and an employee working for the service provider could collude. In this example, if the user knows the decryption key of the data and the employee provides the encrypted data stored in the database, they are able to decrypt all data and bypass the access control mechanisms. Even if a trusted third-party receives the encrypted data from the service provider, decrypts the data, and enforces the access control policies, the user and employee can still collaborate in a chosen plaintext attack to retrieve the data.

In this context, and as introduced above, implementations of the present disclosure are directed to securely executing queries over sensitive, access restricted data on an outsourced database. In some implementations, an encryption-based access control model is provided. In some examples, the access control model defines access control restrictions at the level of attribute values and applies encryption as a relational operation to enforce the access restrictions on a relational algebra. In some implementations, techniques for query execution over encrypted, access restricted data on the database are provided. An example technique includes a query rewriting strategy to adapt relational operations over data encrypted with different keys. Other example techniques include a privacy-preserving routine for performing join operations and set difference operations in a multi-user mode, and a post-processing routine on the client-side, which conserves computational effort on the client, while preserving the confidentiality of the data.

In further detail, implementations of the present disclosure securely process relational operations over encrypted, access restricted relations. In some implementations, and as described in further detail herein, data with different access rights is encrypted with different keys, and query processing is handled over data encrypted with multiple encryption keys. Implementations of the present disclosure enable query processing over access controlled, encrypted data, and overcomes particular challenges. An example challenge is the mapping of any complex access control structure required in a multi-user scenario to an encryption-enforced access control model, which still allows query execution. Another example challenge is efficiently executing a range of queries, while minimizing any revealed information and the number of computations performed on the client-side. Implementations of the present disclosure overcome these challenges using the encryption-based access control model and the herein-described techniques to support the execution of relational operations in a multi-user mode.

Implementations of the present disclosure are described in further detail herein with reference to an example scenario. The example scenario illustrates a problem in enforcing access control policies for encrypted queries in a multi-user mode. It is contemplated, however, that implementations of the present disclosure can be provided in any appropriate scenario.

In the example scenario, a user Alice and a user Bob share a database with a table R and a table S. For example, in the tables, Alice has private access to certain tuples and shares access to other tuples with Bob, and Bob has private access to certain tuples. In this example, the tuples of table R that are accessible only to Alice are encrypted with a key r_a, and the tuples of table S that are accessible only to Alice are encrypted with a key s_a, and tuples that are only accessible to Bob are encrypted with a key r_b and a s_b for tables R and S, respectively. Tuples of table R that are accessible to Alice and Bob are encrypted with a key r_ab, and tuples of table S that are accessible to Alice and Bob are encrypted with a key s_ab. Alice knows keys r_a, r_ab, s_a, and s_ab and Bob knows keys r_b, r_ab, s_b, and s_ab.

Continuing with the example scenario, Alice issues an equal join operation on tables R and S. In response, the database executes a cartesian product on all tuples of R and S that Alice is allowed to access and key-adjusts these tuples to check the equal condition. Current key-adjustment protocols for deterministic encryption schemes cannot enforce access restrictions while key-adjusting the tuples. That is, current key-adjustment protocols reveal private information. To illustrate this, key-adjustments of keys a and ab to a new key c can be provided and are denoted as a~c and ab~c. Existing protocols are symmetric and transitive such that a key-adjustment a~c~ab exists. Consequently, Bob can key-adjust all data encrypted with key a to the shared key ab. This circumvents the defined access restrictions as the key-adjustment reveals information exclusively accessible by Alice. As described in further detail herein, implementations of the present disclosure resolve this problem by enforcing access control in encrypted query processing.

Figure 2:
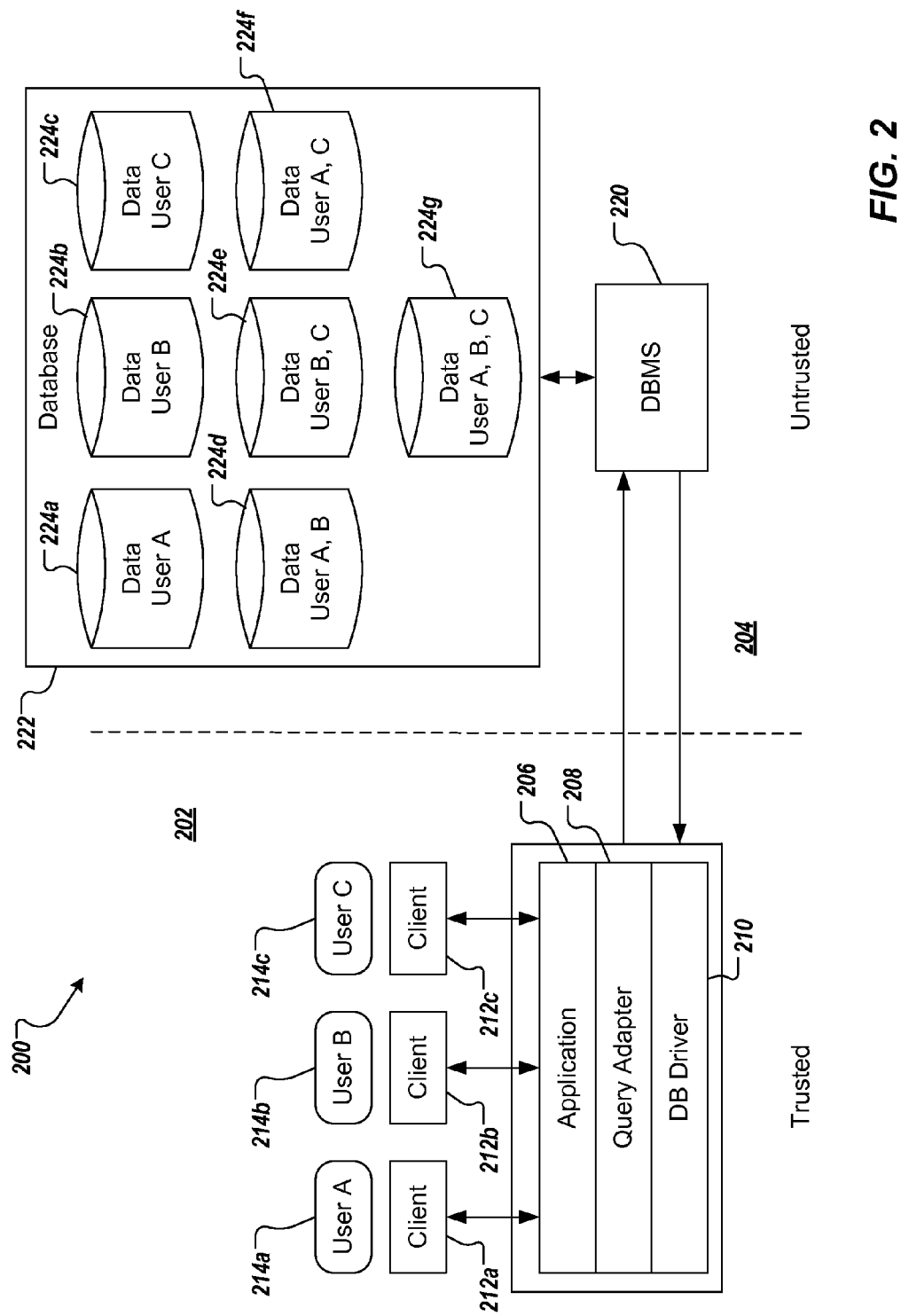
FIG. 2 depicts a schematic architecture and example threat model in accordance with implementations of the present disclosure.

FIG. 2 depicts a schematic architecture 200 and example threat model in accordance with implementations of the present disclosure. The example architecture 200 includes a trusted side 202 (e.g., client-side) and an untrusted side 204 (e.g., server-side, third-party service provider). The trusted side 202 includes an application 206, a query adapter 208 and a database driver 210. In some examples, the application 206, the query adapter 208 and the database driver 210 are each provided as one or more computer-executable programs executed by one or more computing devices (e.g., the server system 104 of FIG. 1). In the depicted example, a plurality of client devices 212a, 212b, 212c (e.g., the computing device 102, 103 of FIG. 1) interact with the application 206. In some examples, users 214a, 214b, 214c (e.g., user Alice, user Bob, user Charlie, respectively) interact with the client devices 212a, 212b, 212c, respectively.

In the depicted example, the untrusted side 204 includes a database management system (DBMS) 220 and a database 222. The database 222 stores encrypted data, to which the users 214a, 214b, 214c have selective access based on one or more access control policies (ACPs). In the example of FIG. 2, the database 222 includes data 224a that is accessible only to the user 214a, data 224b that is accessible only to the user 214b, data 224c that is accessible only to the user 214c, data 224d that is accessible only to the user 214a and/or the user 214b, data 224e that is accessible only to the user 214b and/or the user 214c, data 224f that is accessible only to the user 214a and/or the user 214c, and data 224g that is accessible to the user 214a, the user 214b and/or the user 214c. In some examples, the data 224a, 224b, 224c, 224d, 224e, 224f, 224g each include one or more data tuples.

In some examples, the trusted side 202 corresponds to a data owner (e.g., an entity, such as a company), and the untrusted side 204 corresponds to a third-party service provider (e.g., a cloud hosting company). In some examples, the users 214a, 214b, 214c are agents (e.g., employees) of the data owner. In some examples, the users 214a, 214b, 214c interact with the application 206 through the respective clients 212a, 212b, 212c, which interactions can result in querying of the database 222 through the DBMS 220. In some examples, the DBMS 220 provides query results in response to a query.

In some implementations, the query adapter 208 is an extension of the DB driver 210, which rewrites an incoming query to be processable in a multi-user mode. In some implementations, each client 212a, 212b, 212c post-processes a respective returned query result (e.g., a query result provided to the respective client in response to a query issued by that client). In some implementations, the DMBS 220 is responsive to user-defined functions (UDFs), which perform cryptographic operations. Example cryptographic functions include privacy-preserving key-adjustment of the present disclosure, described in further detail herein.

In the example threat model, implementations of the present disclosure provide data confidentiality for private data of a user even if other (shared) keys of the user are compromised. In some examples, the attacker is passive. That is, the attacker can read all information stored on the database, but does not manipulate the stored data or issued queries.

As introduced above, implementations of the present disclosure provide an encryption-based access control model for specifying access rights based on attribute values of relations and cryptographically enforce the access rights. In some implementations, access restrictions on attribute values of a relation are defined using an access control matrix. In some examples, the access control matrix may serve as a base for more enhanced access models, which can exploit role-based access control.

In an example access control matrix $\mathcal{A}$ the rows correspond to subjects s and the columns correspond to objects o. Table 1, provided below, illustrates an example access control matrix with two users, Alice and Bob, as subjects and a relation R containing five tuples, $t_1, \ldots, t_5$, as objects. The set of all subjects is denoted as S, where $|S|=n$, and the set of all objects is denoted as O.

TABLE 1

| Example Access Control Matrix | | | | | |
|---|---|---|---|---|---|
| User | $t_1$ | $t_2$ | $t_3$ | $t_4$ | $t_5$ |
| Alice | 0 | 1 | 1 | 1 | 1 |
| Bob | 1 | 1 | 0 | 1 | 0 |

In some examples, the data owner grants access for an object o to a subject s by setting the entry in the access matrix $\mathcal{A}$ [s, o] to 1. If no access is granted, the entry is set to 0. A column of an access control matrix is a representation of the set of subjects that have access to an object o. This is denoted as a qualified set of object o (e.g., $QS_o$). For example, the qualified set of object can be understood as the representation of the set of users that have access to a particular object. In some examples, each object can be accessed by at least one subject such that there are no zero columns and no empty qualified sets. In the example of Table 1, above, $QS_{t_4}=\{1,1\}$ is the qualified set of object $t_4$, denoting that user Alice and user Bob both have access to tuple $t_4$.

In some implementations, $\mathcal{P}*(S)$ is provided as the power set of all subjects S without the empty set. In some examples, each of these subsets is denoted as $p_i \in \mathcal{P}*(S)$ for all $i=1, \ldots, 2^n-1$, and can be referred to as a user group. From the example access control matrix of Table 1, three user groups are provided: $p_1=\{Alice\}$, $p_2=\{Bob\}$, and $p_3=\{Alice, Bob\}$. A mapping is provided, which assigns each user to the user groups that the user participates in. For each user s, there is a set of $p_j$ with $j=\{1, \ldots, 2^n-1\}$ of all user groups that the user participates in. This mapping is referred to as a user group mapping (UGM) and can be stored as a relation with the attributes: user and user group. Table 2, provided below, depicts an example user group mapping for the example example access control matrix of Table 1.

TABLE 2

Example User Group Mapping

| User | User Group |
|------|-----------|
| Alice | $p_1$ |
| Alice | $p_3$ |
| Bob | $p_2$ |
| Bob | $p_3$ |

The example of Table 2 shows that user Alice is member of user groups $p_1$ and $p_3$, and that user Bob is member of user groups $p_2$ and $p_3$.

In some implementations, a qualified set of an object maps to one and only one user group, which contains the same set of subjects. Consequently, all objects that are accessible by the same user group are provided in an object set for that user group. In some examples, an object set is provided as:

$$O(p_i)=\{o|o \in O \wedge QS_o=p_i\}$$

for a user group $p_i \in \mathcal{P}^*(S)$. This is the set of all objects assigned to the same user group. In the example of Table 1, example object sets are provided as: $O(p_1)=\{t_3,t_5\}$, $O(p_2)=\{t_1\}$, and $O(p_3)=\{t_2,t_4\}$. It can be noted that all $O(p_i)$ form a partition over O as each two object sets are pairwise disjoint and the union of all object sets (which are non-empty by definition) is equal to the set of all objects O.

This resulting partition can be used to divide the underlying relation. That is, to store each object set in a separate relation, which can be referred to as a virtual relation. In some examples, a virtual relation indicates that one user group can access all of its tuples. This saves the annotation of a tuple with access information as its insertion in a virtual relation implies that this tuple can be accessed by a certain user group. In some examples, for n users, each relation is partitioned in a maximum of $2^n-1$ virtual relations. The total number of tuples does not change as each tuple of a relation is stored in one and only one virtual relation.

In some implementations, a mapping is provided, which assigns each user group and relation to the virtual relation containing the tuples that the particular user group is granted access to. This mapping is referred to as a virtual relation mapping (VRM) and can be stored as a relation with the attributes User Group, Relation, and Virtual Relation, for example. Table 3, provided below, depicts an example virtual relation mapping based on Table 1 and Table 2, described above.

TABLE 3

Example Virtual Relation Mapping

| User Group | Relation | Virtual Relation |
|------------|----------|------------------|
| A | R | $R_A$ |
| B | R | $R_B$ |
| AB | R | $R_{AB}$ |

More particularly, Table 3 depicts the virtual relation mapping for the user groups A, B, and AB and the relation R. The pair user group A and relation R is mapped to virtual relation $R_A$, the pair user group B and relation R is mapped to virtual relation $R_B$, and the pair of user group AB and relation R is mapped to virtual relation $R_{AB}$. In some examples, the data owner specifies and maintains the user group mapping and the virtual relation mapping.

In accordance with implementations of the present disclosure, encryption is provided as a relational operation and the previously defined access restrictions are enforced. In some examples, a relation $R=R(A_1, \ldots, A_n)$ with $A_1, \ldots, A_n$ attributes can be considered. It contains tuples $t_k=(t_{1_k}, \ldots, t_{n_k})$ with $1, \ldots, n$ the number of attributes and $k=1, \ldots, j$ the cardinality. An encryption $\kappa_z(A_i)$ of attribute $A_i$ with key z is provided as:

$$\kappa_z(A_i):=\{\kappa_z(t_{i_k})|t_{i_k} \in A_i \text{ for all } k=1, \ldots, j\}$$

with $t_{i_k}$ being the attribute values of $A_i$ for all $k=1, \ldots, j$.

The encryption of relation $R=R(A_1, \ldots, A_n)$ is the encryption of its attributes $A_1, \ldots, A_n$ and their attribute values $t_{1_k}, \ldots, t_{n_k}$ for all $k=1, \ldots, j$, and is provided as:

$$\kappa_z(R):=R(\kappa_z(A_1), \ldots, \kappa_z(A_n))=\{\kappa_z(t_{1_k}), \ldots, \kappa_z(t_{n_k})$$
$$|t_{i_k} \in A_i \text{ for all } i=1, \ldots, n \text{ and for all}$$
$$k=1, \ldots, j\}.$$

In some implementations, for query processing over encrypted data, adjustable query-based encryption is used. In some examples, adjustable query-based encryption provides onion encryption layers for different classes of computation, which enables the execution of any relational operations over one attribute. In some examples, onion encryption layers are formulated as the composition of encryption operations over an attribute $A_i$, which can be provided as:

OnionDET: $\kappa_z^{RND}(\kappa_z^{DET}(\kappa_z^{JOIN}(A_i)))$
OnionOPE: $\kappa_z^{RND}(\kappa_z^{OPE}(A_i))$
OnionHOM: $\kappa_z^{HOM}(A_i)$ where DET indicates deterministic encryption, OPE indicates order-preserving encryption, HOM indicate homomorphic encryption, and JOIN indicates the privacy-preserving encryption scheme provided in the present disclosure and applied, for example, to execute (equi-) join and set difference operations. In some examples, applying adjustable query-based encryption strategy allows to dynamically adjust layers of encryption on the DBMS server (e.g., the DBMS 220 of FIG. 2) to support relational operations.

In the following description, an encryption scheme is referred to as relational operation $\kappa_z$ with key z relying on the efficient support of encrypted query processing. For purposes of brevity, details of the onion encryption layer, encryption scheme and encryption key have been forgone.

In accordance with implementations of the present disclosure, encryption is used to enforce the access restrictions on tuples of a relation. By way of example, a relation $R=R(A_1, \ldots, A_n)$ and the user groups A, B, and AB can be considered. In some examples, the data owner splits R into virtual relations $R_A$, $R_B$, and $R_{AB}$ such that, for example:

$$R_A(A_1, \ldots, A_n)=R_B(A_1, \ldots, A_n)=R_{AB}(A_1, \ldots, A_n).$$

In some examples, the data owner generates encryption keys for each user group and encrypts the respective virtual relation with the respective encryption key. For example, the data owner generates key r_a for user group A and encrypts $R_A$ as:

$$\kappa_{r\_a}(R_A)=\{\kappa_{r\_a}(t)|t \in R_A\}.$$

Similarly, the data owner generates keys r_b and r_ab and encrypts $R_B$ and $R_{AB}$ for user groups B and AB, respectively. The data owner issues the respective keys to the member(s) of each user group.

In accordance with implementations of the present disclosure, encrypted query processing over a relational operation can be efficiently supported for a single-user mode. In particular, this holds for the following example primitive and derived relational operations: selection, projection, rename, cartesian product, set union, set difference, equi join; and aggregate functions: group by, count distinct, sum, average, maximum, minimum, and sort. In some examples, two count operations are provided, count and count distinct. In some examples, count counts the number of attribute values. In some examples, count distinct counts the number of distinctive attribute values. Both count operations are covered by single-user mode.

The introduction of access restrictions (based on access control policies (ACPs)) on relations, however, interferes with encrypted query processing in multiple ways. In one example, a relational operation is now executed over (potentially) multiple virtual relations depending on the access rights of the user rather than on one relation. To address this, the present disclosure provides query rewriting strategies, described in further detail below. Applying the rewriting strategies does not change the application logic. For example, the user only submits the original, unchanged query and their credentials (e.g., user ID). In some examples, a query adapter (e.g., the query adapter 208 of FIG. 2) rewrites the query and the DB driver (e.g., the DB driver 210 of FIG. 2) adapts the rewritten query for encrypted query processing. As another example, key-adjustments on virtual relations can be needed to support count distinct, equi-join, or set difference operations. These, however, might lead to a data compromise or a malfunction as a key-adjustment might falsely grant or revoke access rights. To address this, the present disclosure provides the privacy-preserving encryption scheme to support key-adjustments in a multi-user mode, as described in further detail below. In some examples, the privacy-preserving encryption scheme provides key-adjustment of attributes or relations encrypted with different keys, while preserving the access rights. As another example, some relational operations can only be executed on the server-side with significant computational effort, huge storage capacities, or diminishing security. To address this, the present disclosure provides a client-server split, requiring small data traffic and minimal computational effort on the client-side, while preserving security, as described in further detail herein.

The above-described features (techniques) can be combined in a multi-user protocol to handle the presence of multiple users described, as described in further detail herein. In some examples, the multi-user protocol receives a user credential (e.g., user ID) and a query, which includes a combination of relational operations, processes the query over virtual relations, and returns the result. In some examples, the multi-user protocol can handle an arbitrary set of users.

The multi-user protocol, incorporating the multiple techniques described herein, will be described in further detail with reference to the examples described above. More particularly, the table R is parted into virtual relations $R_A$, $R_B$, and $R_{AB}$, which are encrypted as $\kappa_{r\_a}(R_A)$, $\kappa_{r\_b}(R_B)$, and $\kappa_{r\_ab}(R_{AB})$, respectively, with keys r_a, r_b r_ab. Table S is treated accordingly.

As introduced above, the present disclosure provides rewriting strategies for the relational operations selection, projection, rename, aggregate function count, set union, and cartesian product over encrypted virtual relations. Applying these rewriting strategies enables the straight-forward execution of these relational operations over encrypted data.

Selection: Consider a predicate $\theta$ (e.g. $=, <, \leq, >, \geq$) and $\alpha, \beta$ attributes, constants, or terms of attributes, constants, and data operations. A selection $\sigma_{\alpha\theta\beta}(R)$ on relation R issued by user Alice is executed on the encrypted virtual relations $\kappa_{r\_a}(R_A)$ and $\kappa_{r\_ab}(R_{AB})$. The condition $\alpha\theta\beta$ has to be applied on both virtual relations. Therefore, $\alpha\theta\beta$ is encrypted with key r_a as $$\kappa_{r\_a}(\alpha)\theta\kappa_{r\_a}(\beta)$$

and with key r_ab as $$\kappa_{r\_ab}(\alpha)\theta\kappa_{r\_ab}(\beta).$$

For example:

$$(\sigma_{\alpha\theta\beta}(R), \text{Alice}) =$$
$$\sigma_{\kappa_{r\_a}(\alpha)\theta\kappa_{r\_a}(\beta)}\kappa_{r\_a}(R_A) \wedge \sigma_{\kappa_{r\_ab}(\alpha)\kappa_{r\_ab}(\beta)}\kappa_{r\_ab}(R_{AB}) =$$
$$\{\kappa_{r\_a}(t) \mid t \in R_A \wedge \kappa_{r\_a}(\alpha)\theta\kappa_{r\_a}(\beta)\} \cup$$
$$\{\kappa_{r\_ab}(t) \mid t \in R_{AB} \wedge \kappa_{r\_ab}(\alpha)\theta\kappa_{r\_ab}(\beta)\}.$$

Projection: Let R' be a relation with $R'(A_{i(1)}, \ldots, A_{i(k)}) \subseteq R(A_1, \ldots, A_n)$, and $R_A'$ and $R_{AB}'$ be the respective virtual relations. A projection $\pi_\beta(R)$ with attribute list $\beta = (A_{i(1)}, \ldots, A_{i(k)}) \subseteq (A_1, \ldots, A_n)$ on relation R issued by user Alice is executed over the virtual relations $\kappa_{r\_a}(R_A)$ and $\kappa_{r\_ab}(R_{AB})$. Accordingly, the attribute list $\beta$ is encrypted with key r_a as:

$$\kappa_{r\_a}(\beta) = \kappa_{r\_a}(A_{i(1)}), \ldots, \kappa_{r\_a}(A_{i(k)})$$

and also encrypted with key r_ab as:

$$\kappa_{r\_ab}(\beta) = \kappa_{r\_ab}(A_{i(1)}), \ldots, \kappa_{r\_ab}(A_{i(k)}).$$

For example:

$$(\pi_\beta(R), \text{Alice}) = \pi_{\kappa_{r\_a}(\beta)}(K_{r\_a}(R_A))$$
$$\cup \pi_{\kappa_{r\_ab}(\beta)}(\kappa_{r\_ab}(R_{AB})) = \{\kappa_{r\_a}(t) \mid r \in R_{A'}\} \cup \{\kappa_{r\_ab}(t) \mid t \in R_{AB}'\}.$$

Rename: A rename $\rho$ of an attribute $A_i \in R$ to Q issued by Alice is executed on the encrypted virtual relations $\kappa_{r\_a}(R_A)$ and $\kappa_{r\_ab}(R_{AB})$. The new attribute name Q is encrypted with key r_a as $\kappa_{r\_a}(Q)$ and with key r_ab as $\kappa_{r\_ab}(Q)$ respectively. It replaces the encrypted original attribute name $A_i$ in the virtual relations. For example:

$$(\rho_{Q \leftarrow A_i}(R), \text{Alice}) =$$
$$\rho_{\kappa_{r\_a}(Q) \leftarrow \kappa_{r\_a}(A_i)}(\kappa_{r\_a}(R_A)) \cup \rho_{\kappa_{r\_ab}(Q) \leftarrow \kappa_{r\_ab}(A_i)}(\kappa_{r\_ab}(R_{AB})).$$

In some examples, a rename is not persisted.

Count: The aggregate function $_\beta\gamma_{Count(A_i)}(R)$ on a relation R issued by Alice is executed on the virtual relations $\kappa_{r\_a}(R_A)$ and $\kappa r\_ab(R_{AB})$. For example:

$$(_\beta\gamma_{Count(A_i)}(R), Alice) =$$

$$\kappa_{r\_a(\beta)}\gamma_{Count(\kappa_{r\_a}(A_i))}\kappa_{r\_a}(R_A) + \kappa_{r\_ab(\beta)}\gamma_{Count(\kappa_{r\_ab}(A_i))}\kappa_{r\_ab}(R_{AB}).$$

In some examples, with count, the aggregate function is executed on server-side, and counts the numbers of attribute values of $A_i$ for virtual relations $\kappa_{r\_a}(R_A)$ and $\kappa_{r\_ab}(R_{AB})$ separately and adds these partial results on the server. The output represents the number of attribute values of attribute $A_i$ accessible by Alice.

Set Union: Let relations R and S have the same set of attributes. A set union R∪S issued by Alice is executed on the virtual relations $\kappa_{r\_a}(R_A)$, $\kappa_{r\_ab}(R_{AB})$, $\kappa_{s\_a}(S_A)$, and $\kappa_{r\_ab}(S_{AB})$. For example:

$$(R\cup S, Alice)=\{\kappa_{r\_a}(t)|t\in R_A\}\cup\{\kappa_{r\_ab}(t)|t\in R_{AB}\}\cup\{\kappa_{s\_a}(t)|t\in S_A\}\cup\{\kappa_{r\_ab}(t)|t\in S_{AB}\}.$$

Cartesian Product: A tuple r of relation R and a tuple s of relation S are provided. A cartesian product R×S issued by Alice is executed on the virtual relations $\kappa_{r\_a}(R_A)$, $\kappa_{r\_ab}(R_{AB})$, $\kappa_{s\_a}(S_A)$, and $\kappa_{s\_ab}(S_{AB})$. For example:

$$(R\times S, Alice)=\{\kappa_{r\_a}(r)\kappa_{s\_a}(S)\nabla\kappa_{r\_a}(r)\kappa_{s\_ab}(S)\nabla\kappa_{r\_ab}(r)\kappa_{s\_a}(S)\nabla\kappa_{r\_ab}(r)\kappa_{s\_ab}(S)|r\in(R_A\nabla R_{AB})\wedge s\in(S_A\nabla S_{AB})\}.$$

In some implementations, key adjustment is provided as a relational operation. For example, processing the unary operation count distinct or the binary operations equi-join and set difference over (deterministically) encrypted virtual relations requires that these virtual relations are encrypted with the same encryption key. This is because these operations rely on comparisons which are only feasible if the same encryption key is used. Implementations of the present disclosure key-adjust virtual relations on the database server, so that all queried attributes share the same encryption key while preserving data confidentiality.

In some implementations, a key-adjustment alters an attribute $\kappa_z(A_i)$ encrypted with key z to enable its decryption with another key y. In some examples, a key-adjustment $\chi_y(\kappa_z(A_i))$ of attribute $A_i$ is provided as:

$$\chi_y(\kappa_z(A_i)):=\{\chi_y(\kappa_z(t_{i_k}))|t_{i_k}\in A_i \text{ for all } k=1,\ldots,j\}=\{\kappa_y(t_{i_k})|t_{i_k}\in A_i \text{ for all } k=1,\ldots,j\}=\kappa_y(A_i)$$

with $t_{i_k}$ the attribute values of $A_i$ for all $k=1, \ldots, j$.
In some examples, the key-adjustment of a relation $\kappa_z(R)$ is the key-adjustment of all attributes. This can be provided as:

$$\chi_y(\kappa_z(R))=R(\chi_y(\kappa_z(A_1)), \ldots, \chi_y(\kappa_z(A_n)))=R(\kappa_y(A_1),\ldots,\kappa_y(A_n))=\kappa_y(R)$$

In some examples, a key-adjustment scheme is called symmetric if:

$$\chi_b(\kappa_a(A_i))=\kappa_b(A_i)\nabla \Rightarrow \chi_a(\kappa_b(A_i))=\kappa_a(A_i)$$

In some examples, a key-adjustment scheme is called transitive if:

$$\chi_b(\kappa_a(A_i))=\kappa_b(A_i)\nabla\chi_c(\kappa_b(A_i))=\kappa_c(A_i)\Rightarrow\chi_c(\kappa_a(A_i))=\kappa_c(A_i).$$

In some implementations, a symmetric and transitive key-adjustment ensures privacy-preserving computations on the database server for the single user mode. However, and as described above, key-adjustment does not preserve data confidentiality in the multi-user mode. Accordingly, implementations of the present disclosure provide a non-symmetric and non-transitive key-adjustment scheme, referred to herein as MDetAdj, which can be described as the cryptographic primitive for count distinct, equi-joins, and set differences in multi user mode.

Accordingly, a deterministic, non-symmetric, non-transitive key-adjustment scheme MDetAdj (KeyGen, Enc, Token, Adj) is provided as a tuple of a plurality of probabilistic polynomial time operations such that:

$k_i \leftarrow$ KeyGen($\lambda$). Randomly choose key $k_i \in \mathbb{Z}_p$. Return $k_i$.
C$\leftarrow$Enc(m, $k_i$). Choose a plaintext m and encrypt it with key $k_i$ as $C=G^{mk_i}\in \mathbb{G}_1$. Return base value C.
T$\leftarrow$Token($k_i$, $k_j$). Generate an adjustment token to key-adjust $k_i$ to temporary key $k_j$ as $$T=G^{\frac{k_j}{k_i}}\in \mathbb{G}_1.$$

Return T.
C'$\leftarrow$Adj(C, T). Key-adjust a ciphertext C encrypted with key $k_i$ to key $k_j$ as:

$$C'=e(C,T)=e\left(G^{mk_i}, G^{\frac{k_j}{k_i}}\right)=e(G,G)^{mk_i\frac{k_j}{k_i}}=e(G,G)^{mk_j}=g^{mk_j}\in\mathbb{G}_2.$$

with e: $\mathbb{G}_1\times\mathbb{G}_1\rightarrow\mathbb{G}_2$ a bilinear, non-degenerated, computable map. Return MDetJoin value C'.

In some implementations, all attribute values are encrypted using the MDetAdj scheme, and the encrypted values are called base values. In some examples, if a key-adjustment is required, the MDetAdj scheme is used to key-adjust the base values and compute the MDetJoin value for a temporary key c. The MDetJoin values are temporarily stored, and the relational operation is processed. In some examples, after the user logs out, the MDetJoin values are deleted.

As described in further detail herein, the key-adjustment of the present disclosure provides a plurality of security guarantees. A first assumption (Assumption 1) is provided and is referred to as the 1-Bilinear Diffie-Hellman Inversion (1-BDHI) Assumption, which provides that the 1-BDHI Assumption holds if, for any probabilistic polynomial time (PPT) adversary $\mathcal{A}$, the probability that $\mathcal{A}$ on input ($G^a$, $G^{a^2}$, $G^{a^3}$, ..., $G^{a^1}$) outputs W, such that $$W=g^{\frac{1}{a}}$$

is negligible in security parameter $\lambda$. In proving this assumption, an adversary (e.g., malicious user) is assumed to be passive (e.g., the adversary can read all encrypted database entries, but does not modify the database entries).

In some examples, the adversary can compromise all user accounts except for Alice's user account. That is, the adversary has access to the private keys $\{d_1, \ldots, d_{n-1}\}$ of all compromised users, which private keys can include private keys shared with Alice, but does not have access to Alice's private key $d_n$. This implies that the adversary can access all database entries encrypted for the compromised users. In particular, the adversary also has access to database entries shared by Alice with other users. The adversary can compute adjustment tokens Token ($d_j$, $d_i$) for all compromised private keys $d_j\in\{d_1, \ldots, d_{n-1}\}$ to be key-adjusted to an arbitrary key $d_i$. Consequently, the adversary can key-adjust the database entries of all compromised users.

In the described scenario, Alice's private database entries are not compromised. These are the database entries encrypted with a private key $d_n$, and are only accessible by Alice. The adversary cannot access these database entries, and cannot request adjustment tokens Token($d_n$, $d_i$), which key-adjust database entries encrypted with Alice's private key $d_n$ to an arbitrary key $d_i$. However, the adversary can request adjustment tokens Token ($d_i$, $d_n$), such that a database entry encrypted with an arbitrary key $d_i$ can be key-adjusted to key $d_n$. In view of the foregoing, the adversary is not able to adjust a private database entry of Alice to another key.

Continuing, $\mathcal{A}$ is provided as a probabilistic time adversary modeled as described above, and $\mathcal{C}$ is a challenger. The following example security game can be provided: $d_1, \ldots, d_n$ is the set of user keys with Alice's user key as $d_n$; $\mathbb{M}$ is the set of all database entries with $s \in \mathbb{M}$ a single database entry, the set of encrypted database entries as all database entries $s \in \mathbb{M}$ encrypted with a key $d_i \in \{d_1, \ldots, d_n\}$; and $\mathbb{T}$ is the set of adjustment tokens Token($d_i$, $d_j$) for all i, j= 1, ... n that allow a database entry encrypted with key $d_i$ to be key-adjusted to key $d_j$.

In accordance with the example security game, $\mathcal{A}$ receives the following information: the encrypted database entries of all users; the keys of all compromised users $d_{i^*} \in \{d_1, \ldots, d_{n-1}\}$; and a subset of adjustment tokens $\mathbb{T}^*$, which contains all tokens Token($d_{i^*}$, $d_i$). In some examples, $\mathbb{T}^*$ does not include those tokens, which allow the key $d_n$ to be key-adjusted to a key $d_{i^*} \in \{d_1, \ldots, d_{n-1}\}$. Further, $\mathcal{A}$ can perform the following actions: $\mathcal{A}$ can choose an arbitrary value s, and can encrypt the value s with key $d_{i^*} \in \{d_1, \ldots, d_{n-1}\}$. This is because as $\mathcal{A}$ knows the keys $\{d_1, \ldots, d_{n-1}\}$ of all compromised users. Although $\mathcal{A}$ does not know the key $d_n$, $\mathcal{A}$ can encrypt an arbitrary value with key $d_n$, because $\mathcal{A}$ can compute:

$$\text{Token}(d_{i^*}, d_n) d_{i^*} = \left(G^{\frac{d_n}{d_{i^*}}}\right)^{d_i^*} = G^{d_n}$$

given a Token($d_{i^*}$, $d_n$) and a key $d_{i^*}$ to encrypt a chosen value s under the uncompromised key $d_n$ of Alice.

Furthermore, $\mathcal{A}$ can choose keys $k_i \in \mathbb{Z}_p$ and $k_j \in \mathbb{Z}_p \setminus \{d_n\}$ and can compute Token($k_i$, $k_j$). $\mathcal{A}$ can key-adjust an encrypted database entry $G^{d_j s}$ with an adjustment token Token($k_i$, $k_j$) as:

$$\text{Adj}(C, T) =$$
$$e\left(G^{k_i m}, G^{\frac{k_j}{k_i}}\right) = e\left(G^{d_i s}, G^{\frac{d_j}{d_i}}\right) = e(G, G)^{d_i s \frac{d_j}{d_i}} = e(G, G)^{d_j s} = g^{d_j s}$$

In accordance with the example security game, $\mathcal{A}$ chooses a key d and sends it to $\mathcal{C}$. $\mathcal{C}$ selects a random value r and encrypts it with key $d_n$ as $G^{rd_n}$. $\mathcal{C}$ sends $G^{rd_n}$ to $\mathcal{A}$ and requests that $\mathcal{A}$ key-adjusts $C=G^{rd_n}$ to key d as $C'_d$. $\mathcal{A}$ can continue to perform its actions against the protocol. At the end of the example security game, $\mathcal{A}$ outputs its guess for $C'_d$.

In accordance with implementations of the present disclosure, MDetAdj is secure, if, for a probabilistic time adversary $\mathcal{A}$, Pr[$\mathcal{A}$ winstheSecurityGameofMDetAdj] is negligible in λ(Definition 1). In some examples, if the L-BDHI Assumption holds, then the key-adjustment protocol of the present disclosure is secure (Theorem 1). To provide this, it can be assumed that the adversary can solve the security game correctly, and a solver for the 1-BDHI problem can be constructed using the adversary $\mathcal{A}$. In some examples, the solver receives an instance of the 1-BDHI Assumption with $G^a, G^{a^2}, \ldots, G^{a^l} \in \mathbb{G}_1$ and computes $$e(G, G)^{\frac{1}{a}} = g^{\frac{1}{a}} \in \mathbb{G}_2.$$

$\mathcal{A}$ chooses a key d and sends it to $\mathcal{C}$. $\mathcal{C}$ picks a valid ciphertext encrypted with key a as:
$C=Enc(m,k)=G^{mk}=G^r$ $\mathcal{C}$ sends $C=G^r$ to $\mathcal{A}$ and requests the key-adjustment of C to key d as:

$$V = g^{\frac{r}{a}d}$$

$\mathcal{A}$ returns its guess for V. $\mathcal{C}$ computes $$W = V^{\frac{1}{rd}}$$

to solve the instance of the 1-BDHI Assumption as:

$$W = V^{\frac{1}{rd}} = \left(g^{\frac{1}{a}d}\right)^{\frac{1}{rd}} = g^{\frac{1}{a}}$$

As introduced above, implementations of the present disclosure provide key-adjustment and rewriting strategies to execute the relational operations count distinct, set difference, and equi-join. Each of these is described in further detail below.

Count Distinct: The aggregate function count distinct $_\beta\gamma_{countDistinct(A_i)}(R)$ on a relation R issued by Alice is executed on the virtual relations $\kappa_{r\_a}(R_A)$ and $\kappa_{r\_ab}(R_{AB})$. As these virtual relations are encrypted with different keys, it is not possible to apply a count distinct. Consequently, the key of both virtual relations are adjusted to key c. This is provided as: $\chi_c$ $(\kappa_{r_a}(R_A))=R_A$ $(\lambda_c$ $(\kappa_{r_a}(A_1)), \ldots, \lambda_c$ $(\kappa_{r_a}(A_n)))=R_A(\kappa_c(A_1), \ldots, \kappa_c(A_n))=\kappa_c(R_A)$, and $\chi_c(\kappa_{r\_ab}(R_{AB}))=\kappa_c(R_{AB})$, respectively. The aggregate function count distinct is then computed as:

$(_\beta\gamma_{CountDistinct(A_i)}(R), \text{Alice})=_{78}$ $_c(\beta)\gamma_{CountDistinct(\kappa_c(A_j))}$ $(\kappa_c(R_A) \cup \kappa_c(R_{AB}))$.

In some examples, count distinct counts the numbers of different attribute values of $A_i$ of all relations accessible by user Alice.

Set Difference: Let relations R and S have the same set of attributes. A set difference R\S of relation S in relation R issued by Alice is executed on the virtual relations $\kappa_{r\_a}(R_A)$, $\kappa_{r\_ab}(R_{AB}), \kappa_{s\_a}(S_A)$, and $\kappa_{s\_ab}$. As these virtual relations are encrypted with different keys, it is not possible to apply a set difference. Therefore, keys of all virtual relations are adjusted to key c. This is provided as: $\chi_c$ $(\kappa_{r\_a}(R_A))=R_A(\chi_c$ $(\kappa_{r\_a}(A_1)), \ldots, \chi_c(\kappa_{r\_a}(A_n)))=R_A(\kappa_c$ $(A_1), \ldots, \kappa_c$ $(A_n))=$ $\kappa_c(R_A)$ and $\kappa_c(R_{AB})$, $\kappa_c(S_A)$, and $\kappa_c$ $(S_{AB})$, respectively. The set difference on the key-adjusted virtual relations can be provided as:

$R \backslash S = \{\kappa_c(t) | t \in (R_A \vee R_{AB}) \wedge t \notin (S_A \vee S_{AB})\}$ Equi-Join: An equi-join issued by user Alice between two relations $R=R(A_1, \ldots, A_n)$ and $S=S(B_1, \ldots, B_m)$ on their respective attributes $A_i$ and $B_j$ is executed on the virtual relations $\kappa_{r\_a}(R_A)$, $\kappa_{r\_ab}(R_{AB})$, $\kappa_{s\_a}(S_A)$, and $\kappa_{s\_ab}(S_{AB})$. However, the attributes $A_i$ and $B_j$ are encrypted with different keys within the relations ($A_i$ is encrypted with key r_a in relation $R_A$ and with key r_ab in relation $R_{AB}$ and $B_j$ is encrypted with key s_a in relation $S_A$ and with key s_ab in relation $S_{AB}$). To apply the condition $A_i = B_j$ on the accessible subsets of R and S, the key of all virtual relations and the condition are adjusted with a shared encryption key. This is provided as: $\chi_c(\kappa_{r_a}(R_A)) = \kappa_c(R_A)$, and the keys of $\kappa_c(R_{AB})$, $\kappa_c(S_A)$, and $\kappa_c(S_{AB})$ are respectively adjusted. The condition $A_i = B_j$ as $\kappa_c(A_i) = \kappa_c(B_j)$. Because all involved relations are encrypted with the same key c, the encrypted condition can be applied as follows: $(R \bowtie_{A_i=B_j} S, \text{Alice}) = \{\kappa_c(r)\kappa_c(s) | r \in (R_A \vee R_{AB}) \wedge s \in (S_A \vee S_{AB}) \wedge \kappa_c(r_i)\theta\kappa_c(S_j)\}$.

As introduced above, implementations of the present disclosure further provide a client-server split, requiring small data traffic and minimal computational effort on the client-side, while preserving security. In some examples, aggregate functions count, count distinct, group by, sum, average, maximum, minimum, and sort compute key figures over a whole relation. The encrypted processing of the aggregation results is supported on the server in the single user mode. Server-side execution of count and count distinct are described above for the multi-user mode.

Introducing virtual relations to specify access restrictions, aggregate functions cannot be executed over the whole relation as this relation is split in different virtual relations encrypted with different keys. In order to evaluate an aggregate function, a user has to process the aggregate function over all virtual relations that the user is allowed to access. These virtual relations are encrypted with different encryption keys. Typically, the evaluation of aggregation results requires that all invoked virtual relations are encrypted with a shared encryption key.

In accordance with implementations of the present disclosure, a client-server split is provided for evaluating the aggregation function. Accordingly, computational effort is executed over encrypted data and encrypted partial result sets are issued to the client, where they are decrypted and further processed to receive the final result. In some implementations, execution of the aggregate functions are split between server and client as follows: on the server—computation of the encrypted results for each virtual relation (partial results); and on the client—decryption of the partial results and computation of a function $\mathcal{F}_{Agg}$, which takes the unencrypted partial results as input, and computes the final result depending on the underlying aggregate function.

To illustrate this approach, an aggregate function $F(A_i)$ can be considered, which computes maximum, minimum, average, sum, or sort over an attribute $A_i$. Let $\beta = (A_1, \ldots, A_k)$ be an attribute list to group the results. If $\beta = \emptyset$, then there is no group-by function defined. An aggregate function $_\beta\gamma_{F(A_j)}(R)$ on a relation R issued by Alice is executed over the virtual relations $R_A$ and $R_{AB}$. Consequently, the attribute list $\beta$ is encrypted with key r_a as $\kappa_a(\beta)$ and with key r_ab as $\kappa_{r\_ab}(\beta)$. The function $F(A_i)$ is also encrypted with key r_a as $F(\kappa_a(A_i))$ and with key ab as $F(\kappa_{r\_ab}(A_i))$. The partial result for virtual relation $R_A$ can be computed on the server as:

$$\kappa_{r\_a}(Res(R_A)) =_\beta \gamma_{F(\kappa_{r\_a}(A_i))}\kappa_{r\_a}(R_A) =_{\kappa_{r\_a}(\beta)} \gamma_{F(\kappa_{r\_a}(A_i))}\kappa_{r\_a}(R_A)$$

The partial result for virtual relation $R_{AB}$ can be computed on the server as:

$$\kappa_{r\_ab}(Res(R_{AB})) =_\beta \gamma_{F(\kappa_{r\_a}(A_i))}\kappa_{r\_a}(R_{AB}) =_{\kappa_{r\_ab}(\beta)} \gamma_{F(\kappa_{r\_ab}(A_i))}\kappa_{r\_ab}(R_{AB})$$

The partial results $\kappa_{r\_a}(Res(R_A))$ and $\kappa_{r\_ab}(Res(R_{AB}))$ are sent to the client by the server, and the client decrypts the partial results. On the client, the function $\mathcal{F}_{Agg}$ is computed, which takes as input the unencrypted partial results. This is provided as: $\mathcal{F}_{Agg} = \text{Agg}(Res\ R_A), Res(R_{AB}))$, which is the final result.

In some implementations, $\mathcal{F}_{Agg}$ is defined based on the underlying aggregate function.

Maximum/Minimum: $Res(R_A) = Max(R_A)$ and $Res(R_{AB}) = Max(R_{AB})$, and $\mathcal{F} F_{Agg} = \mathcal{F}_{Max}$ is determined as: $\mathcal{F}_{Max} = Max(Max(R_A), Max(R_{AB}))$. This also holds for the computation of the minimum.

Sum: $Res(R_A) = Sum(R_A)$ and $Res(R_{AB}) = Sum(R_{AB})$, and $\mathcal{F}_{Agg} = \mathcal{F} F_{sum}$ is determined (on the client) as $\mathcal{F}_{sum} = Sum(R_A) + Sum(R_{AB})$.

Average. The aggregate function average is replaced by the aggregate functions sum and count. This provides the partial results $Res(R_A) = \{Sum(R_A), Count(R_A)\}$, and $Res(R_{AB}) = \{Sum(R_{AB}), Count(R_{AB})\}$, and $\mathcal{F}_{Agg} = \mathcal{F}_{Avg}$ is determined as:

$$F_{Avg} = \frac{Sum(R_A) + Sum(R_{AB})}{Count(R_A) + Count(R_{AB})}.$$

Sort: $Res(R_A) = Sort(R_A)$ and $Res(R_{AB}) = Sort(R_{AB})$, each a sorted list, and $\mathcal{F}_{Agg} = \mathcal{F}_{Sort}$ is determined as $\mathcal{F}_{Sort} = \text{Merge\_sorted\_lists}(Sort(R_A), Sort(R_{AB}))$.

Group By: The aggregate function group by provides the grouped results for virtual relations $R_A$ and $R_{AB}$, as partial results. The partial results are provided as $Res(R_A) = \{Agg(R_A) \text{ grouped by } R_A.A_i\}$ and $Res(R_{AB}) = \{Agg(R_{AB}) \text{ grouped by } R_{AB}.A_i\}$, which are computed (on the client) as: if $R_A.A_i = R_{AB}.A_i$, these groups of $R_A$ and $R_{AB}$ are merged and the merged group is included in the final result; and if $R_A.A_i \neq R_{AB}.A_i$, the partial result is taken in the final result.

For the multi-user scenario, a multi-user operation is provided, which allows an arbitrary set of users to execute a query (i.e., a combination of relational operations) over a set of access restricted relations. In some examples, the multi-user operation takes a user credential (e.g., user ID) and an unencrypted query and returns the final result of the query as output. The user credential is an identifier that is unique to a respective user. In some examples, a query is a combination of relational operations over one or more relations. The final result is the decrypted result of the query.

As introduced above, a relation R with attributes $A_1, \ldots, A_n$ and a relation S with attributes $B_1, \ldots, B_m$, can be considered. The data owner splits relation R in the virtual relations $R_1, \ldots, R_k$ encrypted with keys $v_1, \ldots, v_k$, respectively. The data owner also splits relation S in virtual relations $S_1, \ldots, S_l$, which are encrypted with keys $w_1, \ldots, w_l$, respectively. The data owner handles n users. Each user is equipped with a respective user credential. The data owner defines the user group mapping where each user credential is related to its user groups, and defines the virtual relation mapping, where each pair of user group and relation is assigned to a virtual relation. In one example, a user is a member in i+j different user groups. For relation R, the user is a member in user groups, which are assigned to virtual relations $\kappa_{v_1}(R_1), \ldots, \kappa_{v_i}(R_i)$ and for relation S, the user is member in user groups, which are assigned to virtual relations $\kappa_{w_1}(S_1), \ldots, \kappa_{w_j}(S_j)$.

In some implementations, the multi-user operation executes the following example functions: look-up, key-adjustment, query rewriting, query encryption, server-side execution, and client-side execution. With regard to look-up the virtual relations are determined based on the query and the user credential, and it is determined whether the required attributes are encrypted with the necessary encryption layer. With regard to key-adjustment, a key-adjustment is performed, if the query includes at least one of a set of predefined operations (e.g., count distinct, equi join, or set difference) that may require key adjustment. With regard to query rewriting, the query is adapted for application on virtual relations to provide a rewritten query. An example query rewriting operation is described in further detail below. With regard to query encryption, all elements (e.g., attributes, conditions, attribute list) of the rewritten query are encrypted. With regard to server-side execution, the rewritten, encrypted query is processed over encrypted data, and the encrypted results are returned to the client. With regard to client-side execution, the returned, encrypted results are decrypted, and further processing is performed, if required. Each of these functions are described in further detail below with reference to an arbitrary query and a user ID.

In some implementations, and with reference to FIG. 2, the query adapter 208 receives a user ID and a (cleartext) query (e.g., from the application 206), the user ID identifying the user (e.g., user 214a, 214b, 214c) that submitted the query. In some examples, the query adapter 208 performs the look-up, key-adjustment, query rewriting and query encryption, and transmits an encrypted query to the server-side (e.g., the DBMS 220).

Look Up: the user group mapping is referenced to identify all user groups containing the user ID. Given these user groups and the relation(s) contained in the query, all virtual relations for each pair of user group and relation(s) are determined based on the virtual relation mapping.

Key-Adjustment: if the query contains equi-join, a set difference, or a count distinct, the keys of all involved relations are adjusted to a temporary key c.

Query Rewriting: the query rewriting operation is executed to modify the original query to be executable over the required virtual relations $\kappa_{v_1}(R_1), \ldots, \kappa_{v_i}R_i$ and $\kappa_{w_1}(S_1), \ldots, \kappa_{w_j}(S_j)$. In some implementations, and as described in further detail below, the query rewriting operation takes as input the query Q, which can contain one or more unary or binary operations over relation R (and relation S). The query rewriting operation returns a rewritten query sQ to be executed on the server. In some examples, the query rewriting operation also a rewritten query cQ to be executed on the client.

Query Encryption: all attributes of the rewritten query sQ are encrypted. If there exists a condition aθb with a, b attributes, then the attributes a and b of relations accessible by this user are encrypted with the same key c. This is to adjust all attributes $R_k$. a for $k=1, \ldots,$ i and all attributes $S_l$. b for $l=1, \ldots,$ i to the same key c. If not and b is a constant, aθb is encrypted with all keys $v_1, \ldots, v_i$. The attribute list $\beta = A_{i_{(1)}}, \ldots, A_{i_{(k)}}$ of a projection or an aggregate function is encrypted with the keys $v_1, \ldots, v_i$ of the accessible relations $R_1, \ldots, R_i$ of this user. This step encrypts the aggregate function $F(A_i)$ with key $v_1, \ldots, v_i$.

Server-side Execution: the server executes the rewritten, encrypted query sQ and returns the encrypted results to the client.

Client-side Execution: the client receives the encrypted results and decrypts the encrypted results to provide cleartext (unencrypted) results. If a query cQ is not provided (e.g., from the query rewriting operation), the query processing is finished. If a query cQ is provided, the client executes the query cQ over the decrypted results to provide the final result.

FIG. 3 depicts an example listing for a query rewriting operation in accordance with implementations of the present disclosure. With reference to the example listing, for all avg $\in Q$, $_\beta\gamma_{Avg(A_i)}(R)$ is rewritten as $Q_k=_\beta\gamma_{Sum,Count(A_i)}(R)$, and a client-side query cQ (including $Q_k=_{62}\gamma_{Sum,Count(A_i)}(R)$) is provided; for all $\rho \in Q$, $\rho(R)$ is rewritten as $Q_t=\rho(\kappa_{v_k}(R_k))$ for all $t=1, \ldots,$ i; for all unary $\sigma \in Q$, $Q_{t=\sigma(R)}$ is rewritten as $_{Qt}=\sigma(\kappa_{v_k}(R_k))$ for all k, $t=1, \ldots,$ i; and for all $\pi \in Q$, $\pi(R)$ is rewritten as $Q_t=\pi(R_k)$ for all k, $t=1, \ldots,$ i. Continuing, for all max $\nabla$ min $\nabla$ sum $\in Q$, $\gamma_{F(R,A_i)}\Delta R$ is rewritten as $Q_t=\gamma_{F(R_k,A_i)}\Delta(v_{v_k}(R_k))$ for all k, $t=1, \ldots,$ i, where, if $\exists$ cQ then cQ is modified (e.g., to include $Q_t=\gamma_{F(R_k,A_i)}\Delta(K_{v_k}(R_k))$), otherwise cQ is generated (to include $Q_t=\gamma_{F(R_k,A_i)}\Delta(K_{v_k}(R_k))$). Continuing, for all $\cup \nabla \times \nabla \bowtie \in Q$, $\Delta(R, S)$ is rewritten as $Q_t=R_k, S_l$ for all $k=1, \ldots,$ i, $l=1, \ldots,$ j, and $t=1, \ldots i^*j$; for all sort $\nabla$ group $\in Q$, $_\beta\gamma_{F(R,A_i)}\Delta(Qt)$ is rewritten as $_\beta\gamma_{F(R_k,A_i)}\Delta(Qt)$ for all $t=1, \ldots,$ i in case Q unary, or for all $t=1, \ldots, i^*j$ in case Q binary, and if $\exists$ cQ, cQ is modified (e.g., to include $\beta\gamma F_{(R_k,A_i)}\Delta(Qt)$), otherwise cQ is generated (to include $_\beta\gamma_{F(R_k,A_i)}\Delta(Qt)$). If Q is unary, $\Delta R$ is rewritten as $sQ=\cup_{t=1, \ldots, i} Q_t$, and if Q is binary, $\Delta(R, S)$ is rewritten as $sQ=\cup_{t=1, \ldots, i^*j} Q_t$. For all count distinct $\nabla$ count $\in Q$, $_\beta\gamma_{F(R_k,A_i)}(sQ)$ is rewritten as $sQ=_{62}\gamma_{F(R_k,A_i)}SQ$. The server-side query sQ is returned from the query rewriting operation and includes operations that are not include in the client-side query (cQ), if cQ is generated. If cQ is generated, cQ is also returned (e.g., to the client with the encrypted results).

Figure 4:
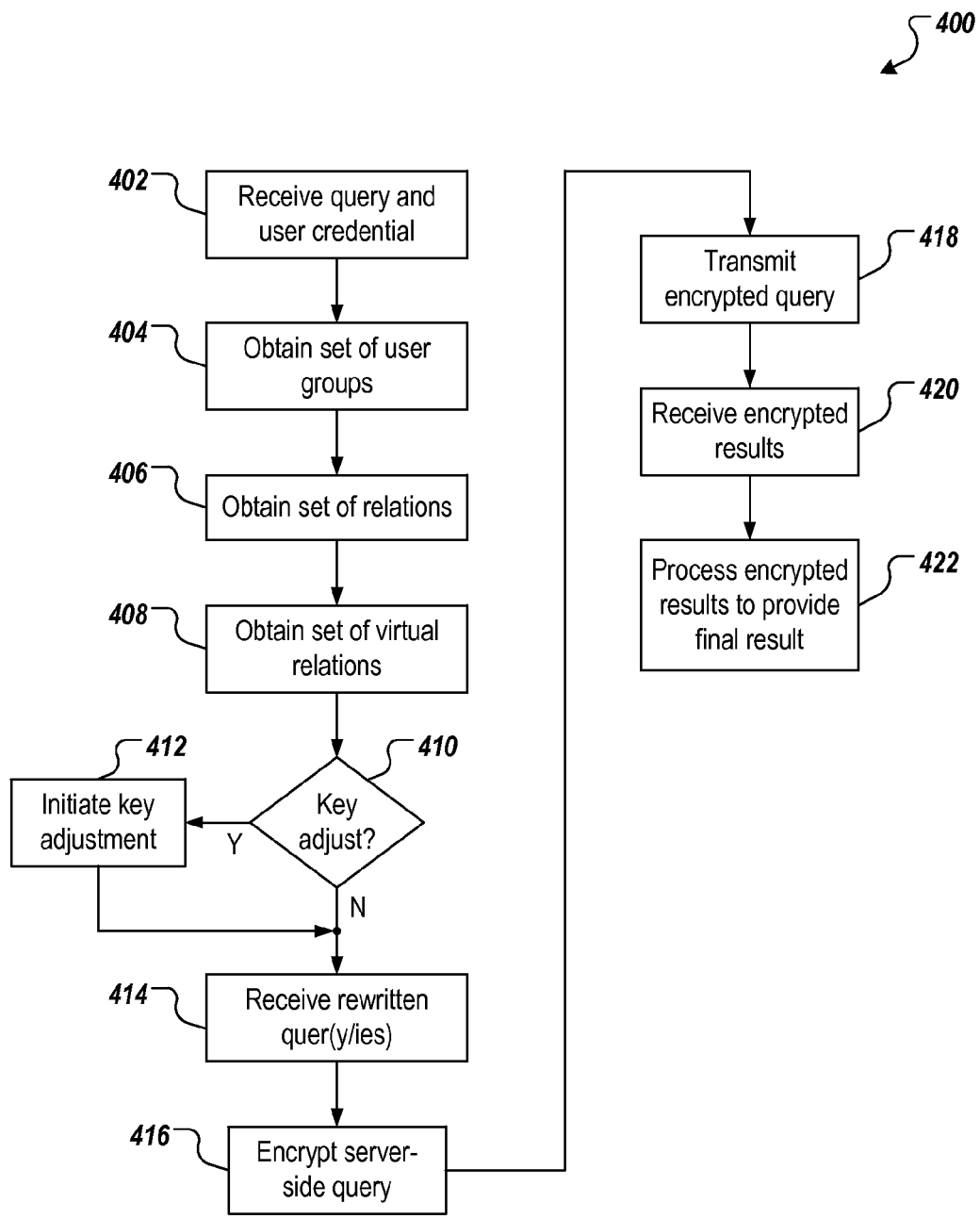
FIG. 4 depicts an example process that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some examples, the query adapter of 208 of FIG. 2 performs operations of the example process 400.

A query and a user credential are received (402). In some examples, the user credential (e.g., user ID) uniquely identifying a user requesting execution of the query. A set of user groups is obtained (404). In some examples, the set of user groups is obtained based on the user credential and a user group mapping. In some examples, the user group mapping maps one or more users to one or more user groups based on an access control matrix that indicates which users are allowed access to which data stored in an encrypted database. A set of relations is obtained (406). For example, the set of relations is obtained based on the query. A set of virtual relations is obtained (408). In some examples, the set of virtual relations is obtained based on the set of user groups and the set of relations. In some examples, the set of virtual relations is obtained further based on a virtual relation mapping that maps at least one relation and user group pair to a virtual relation.

It is determined whether a key adjustment is required (410). For example, if the query includes one or more operations that are included in a set of predefined operations (e.g., equi-join, set difference, count distinct), key adjustment is required. If key adjustment is required, key adjustment is initiated (412). For example, encryption keys of any implicated relations are adjusted to a temporary encryption key c.

One or more rewritten queries are received (414). For example, a query rewriting operation is performed on the query to provide at least a server-side query (sQ). In some examples, the query rewriting operation also provides a client-side query (cQ). In some examples, the query rewriting operation provides the one or more queries based on the query and the set of virtual relations. The server-side query is encrypted (416). For example, the server-side query is encrypted to provide an encrypted query. The encrypted query is transmitted (418). For example, the encrypted query is transmitted to at least one server computing device over a network (e.g., to a server computing device hosting the DBMS 220 of FIG. 2). Encrypted results are received (420). For example, encrypted results including encrypted data are determined (e.g., by the server computing device(s)) and are provided to the client-side. The encrypted results are processed to provide a final result (422). In some examples, the encrypted results are decrypted to provide a query result (e.g., cleartext data). In some examples, the query result is the final result. In some examples, if a client-side query was provided, the client-side query is executed over the query result to provide the final result.

Figure 5:
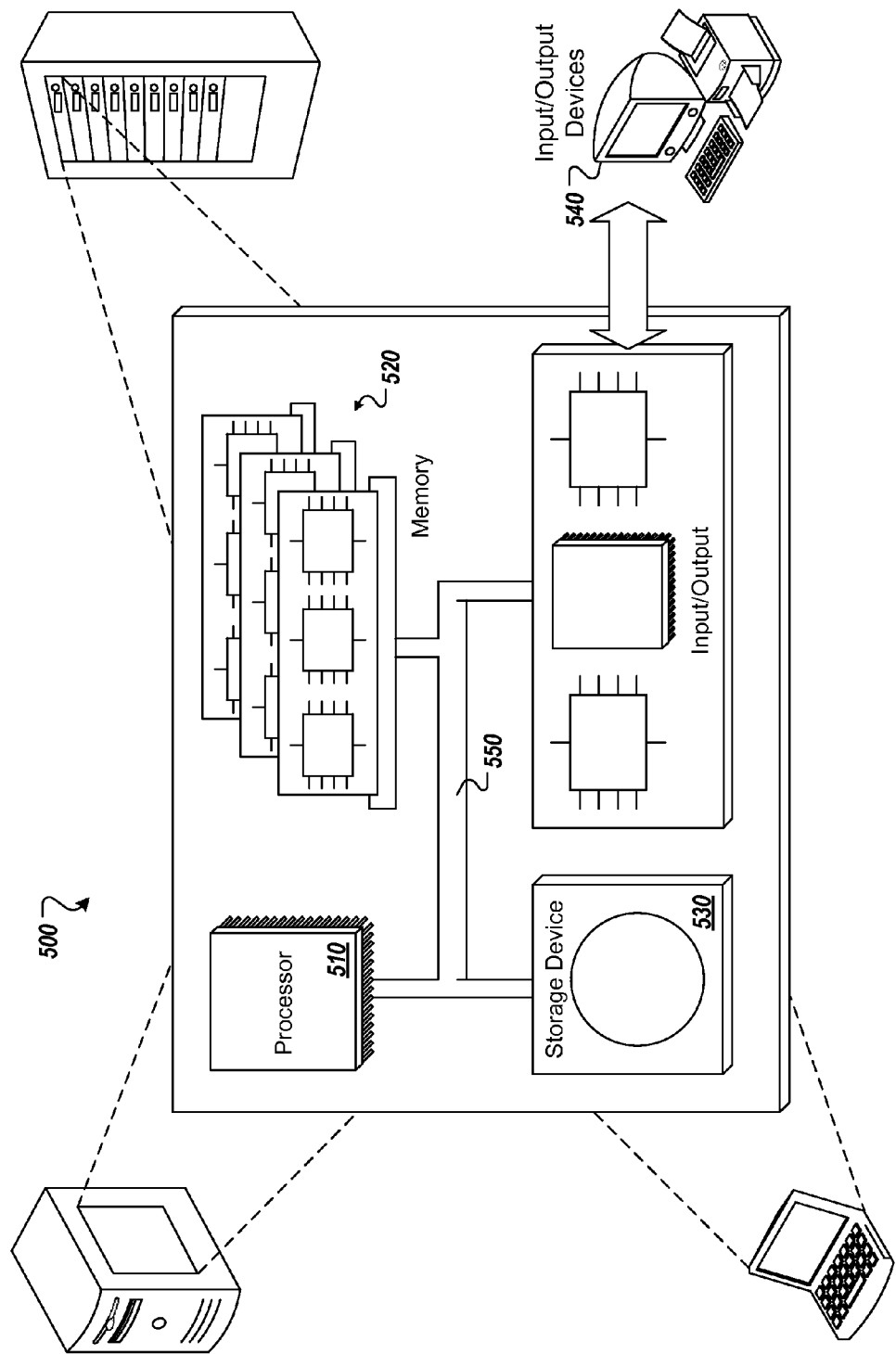
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for enforcing access control in encrypted query processing, the method being executed using one or more processors and comprising:
receiving, by the one or more processors, a query and a user credential, the user credential uniquely identifying a user requesting execution of the query;
obtaining, by the one or more processors, a set of user groups based on the user credential and a user group mapping, the set of user groups comprising at least one user group;
obtaining, by the one or more processors, a set of relations based on the query;
obtaining, by the one or more processors, a set of virtual relations based on the set of user groups and the set of relations, the set of virtual relations comprising at least one virtual relation;
receiving, by the one or more processors, a first rewritten query based on the set of virtual relations and a query rewriting operation;
encrypting, by the one or more processors, the first rewritten query to provide an encrypted query; and
transmitting, by the one or more processors, the encrypted query to at least one server computing device over a network for execution of the encrypted query over access controlled, encrypted data.

2. The method of claim 1, further comprising determining that the query comprises at least one operation that is included in a set of predefined operations, and in response, initiating a key adjustment.

3. The method of claim 1, wherein the user group mapping maps one or more users to one or more user groups, based on an access control matrix that indicates which users are allowed access to which data stored in an encrypted database.

4. The method of claim 1, wherein the set of virtual relations is obtained further based on a virtual relation mapping that maps at least one relation and user group pair to a virtual relation.

5. The method of claim 1, further comprising:
receiving an encrypted result from the server computing device; and
decrypting the encrypted results to provide a query result.

6. The method of claim 5, further comprising:
receiving a second rewritten query based on the set of virtual relations and the query rewriting operation; and
obtaining a final query result based on the second rewritten query and the query result.

7. The method of claim 1, wherein the set of pre-defined operations comprises one or more of a count operation, a count distinct operation, an equi-join operation, and a set difference operation.

8. A non-transitory computer-readable storage medium coupled to one or more processors and having instructions stored thereon which, when executed by the one or more processors, cause the one or more processors to perform operations for enforcing access control in encrypted query processing, the operations comprising:
receiving, by the one or more processors, a query and a user credential, the user credential uniquely identifying a user requesting execution of the query;
obtaining a set of user groups based on the user credential and a user group mapping, the set of user groups comprising at least one user group;
obtaining a set of relations based on the query;
obtaining a set of virtual relations based on the set of user groups and the set of relations, the set of virtual relations comprising at least one virtual relation;
receiving a first rewritten query based on the set of virtual relations and a query rewriting operation;
encrypting the first rewritten query to provide an encrypted query; and
transmitting the encrypted query to at least one server computing device over a network for execution of the encrypted query over access controlled, encrypted data.

9. The computer-readable storage medium of claim 8, wherein operations further comprise determining that the query comprises at least one operation that is included in a set of predefined operations, and in response, initiating a key adjustment.

10. The computer-readable storage medium of claim 8, wherein the user group mapping maps one or more users to one or more user groups, based on an access control matrix that indicates which users are allowed access to which data stored in an encrypted database.

11. The computer-readable storage medium of claim 8, wherein the set of virtual relations is obtained further based on a virtual relation mapping that maps at least one relation and user group pair to a virtual relation.

12. The computer-readable storage medium of claim 8, wherein operations further comprise:
receiving an encrypted result from the server computing device; and
decrypting the encrypted results to provide a query result.

13. The computer-readable storage medium of claim 12, wherein operations further comprise:
receiving a second rewritten query based on the set of virtual relations and the query rewriting operation; and
obtaining a final query result based on the second rewritten query and the query result.

14. The computer-readable storage medium of claim 8, wherein the set of pre-defined operations comprises one or more of a count operation, a count distinct operation, an equi-join operation, and a set difference operation.

15. A system, comprising:
a computing device; and
a computer-readable storage device coupled to the computing device and having instructions stored thereon which, when executed by the computing device, cause the computing device to perform operations for enforcing access control in encrypted query processing, the operations comprising:
obtaining a set of user groups based on the user credential and a user group mapping, the set of user groups comprising at least one user group;
obtaining a set of relations based on the query;
obtaining a set of virtual relations based on the set of user groups and the set of relations, the set of virtual relations comprising at least one virtual relation;
receiving a first rewritten query based on the set of virtual relations and a query rewriting operation;
encrypting the first rewritten query to provide an encrypted query; and
transmitting the encrypted query to at least one server computing device over a network for execution of the encrypted query over access controlled, encrypted data.

16. The system of claim 15, wherein operations further comprise determining that the query comprises at least one operation that is included in a set of predefined operations, and in response, initiating a key adjustment.

17. The system of claim 15, wherein the user group mapping maps one or more users to one or more user groups, based on an access control matrix that indicates which users are allowed access to which data stored in an encrypted database.

18. The system of claim 15, wherein the set of virtual relations is obtained further based on a virtual relation mapping that maps at least one relation and user group pair to a virtual relation.

19. The system of claim 15, wherein operations further comprise:
   receiving an encrypted result from the server computing device; and
   decrypting the encrypted results to provide a query result.

20. The system of claim 19, wherein operations further comprise:
   receiving a second rewritten query based on the set of virtual relations and the query rewriting operation; and
   obtaining a final query result based on the second rewritten query and the query result.

* * * * *